(12) United States Patent
Freeman

(10) Patent No.: US 6,636,370 B2
(45) Date of Patent: *Oct. 21, 2003

(54) WINDSHIELD FOR HEAD-UP DISPLAY SYSTEM

(75) Inventor: Glenn E. Freeman, Tarentum, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/138,064

(22) Filed: Aug. 21, 1998

(65) Prior Publication Data

US 2002/0008926 A1 Jan. 24, 2002

Related U.S. Application Data

(62) Division of application No. 08/664,033, filed on Jun. 13, 1996, now Pat. No. 5,812,332, which is a division of application No. 08/038,749, filed on Mar. 26, 1993, now abandoned, which is a continuation-in-part of application No. 07/747,765, filed on Aug. 20, 1991, now abandoned, which is a continuation-in-part of application No. 07/654,408, filed on Feb. 8, 1991, now abandoned, which is a continuation of application No. 07/414,492, filed on Sep. 28, 1989, now abandoned.

(51) Int. Cl.[7] .................... G02B 27/00; B32B 3/00; B32B 17/10; B32B 27/00
(52) U.S. Cl. .................. 359/894; 359/630; 428/156; 428/172; 428/192; 428/215; 428/220; 428/437; 156/99; 156/100; 156/102; 296/84.1
(58) Field of Search ................... 359/630, 894; 428/156, 172, 192, 215, 220, 437, 159, 213; 156/99, 100, 102; 296/84.1

(56) References Cited

U.S. PATENT DOCUMENTS

| 1,805,969 A | 5/1931 | Bostrom |
| 1,871,877 A | 8/1932 | Buckman |
| 2,202,690 A | 5/1940 | Fix |
| 2,264,044 A | 11/1941 | Lee |
| 2,641,159 A | 6/1953 | Mihalakis |

(List continued on next page.)

FOREIGN PATENT DOCUMENTS

| DE | 2263479 | 8/1973 |
| DE | 3532120 A1 | 3/1987 |
| EP | 0022727 | 1/1981 |
| EP | 0026883 | 4/1981 |
| EP | 0229876 A2 | 7/1987 |

(List continued on next page.)

OTHER PUBLICATIONS

Japan Autotech Report, Jul. 31, 1988, p. 32.
Defensive Publication 861 O.G. 1019, S.N. 739,939, Laminated Glass Assembly with Tapered Inner Layer, Apr. 22, 1969, By. H. V. Christensen.

*Primary Examiner*—Ricky D. Shafer
(74) *Attorney, Agent, or Firm*—Andrew C. Siminerio; Donald C. Lepiane

(57) ABSTRACT

A windshield for a head-up display system has a pair of opposing major surfaces that are nonparallel to one another in selected areas. Light rays directed toward the nonparallel area of the windshield are reflected from the outer and inner major surfaces of the windshield and directed toward the eye of the observer as parallel or superimposed light rays to eliminate ghost images when viewing images projected by the head-up display system through the windshield. The interlayer blank utilized to make the windshield has a non-uniform thickness profile with a tapered thickness positioned in the selected areas of the windshield.

11 Claims, 4 Drawing Sheets

U.S. PATENT DOCUMENTS

| | | | |
|---|---|---|---|
| 2,750,833 A | | 6/1956 | Gross |
| 3,122,602 A | | 2/1964 | Page |
| 3,236,290 A | * | 2/1966 | Lueder |
| 3,276,813 A | | 10/1966 | Shaw |
| 3,446,916 A | | 5/1969 | Abel et al. |
| 3,505,160 A | | 4/1970 | Michaels et al. |
| 3,554,722 A | | 1/1971 | Harvey et al. |
| 3,591,261 A | | 7/1971 | Harvey et al. |
| 3,647,285 A | | 3/1972 | Harvey et al. |
| 3,697,154 A | | 10/1972 | Johnson |
| 3,723,805 A | | 3/1973 | Scarpino et al. |
| 3,848,974 A | | 11/1974 | Hosking et al. |
| 3,868,286 A | | 2/1975 | Fariss et al. |
| 3,870,405 A | | 3/1975 | Hedges |
| 3,881,043 A | | 4/1975 | Rieser et al. |
| 3,887,273 A | | 6/1975 | Griffiths |
| 3,899,241 A | | 8/1975 | Malobicky, Jr. et al. |
| 3,922,456 A | | 11/1975 | Baldridge |
| 3,940,204 A | | 2/1976 | Withrington |
| 4,201,351 A | | 5/1980 | Tolliver |
| 4,218,111 A | | 8/1980 | Withrington et al. |
| 4,261,635 A | | 4/1981 | Freeman |
| 4,316,868 A | * | 2/1982 | Esposito et al. |
| 4,398,799 A | | 8/1983 | Swift |
| 4,443,691 A | * | 4/1984 | Sauer |
| 4,554,713 A | | 11/1985 | Chabal |
| 4,610,771 A | | 9/1986 | Gillery |
| 4,613,200 A | | 9/1986 | Hartman |
| 4,711,544 A | | 12/1987 | Iino et al. |
| 4,740,780 A | | 4/1988 | Brown et al. |
| 4,787,711 A | | 11/1988 | Suzuki et al. |
| 4,792,536 A | | 12/1988 | Pecoraro et al. |
| 4,820,902 A | | 4/1989 | Gillery |
| 4,842,389 A | | 6/1989 | Wood et al. |
| 4,892,386 A | | 1/1990 | Suzuki et al. |
| 4,933,227 A | | 6/1990 | Stewart |
| 4,943,140 A | | 7/1990 | Woodard et al. |
| 4,961,625 A | | 10/1990 | Wood et al. |
| 4,988,976 A | | 1/1991 | Lu |
| 4,998,784 A | | 3/1991 | Freeman et al. |
| 4,999,011 A | | 3/1991 | Suzuki et al. |
| 4,999,012 A | | 3/1991 | Suzuki et al. |
| 5,005,009 A | | 4/1991 | Roberts |
| 5,013,134 A | | 5/1991 | Smith |
| 5,087,502 A | | 2/1992 | Esposito et al. |
| 5,130,174 A | | 7/1992 | Esposito |
| 5,332,888 A | * | 7/1994 | Tausch et al. |
| 5,639,538 A | | 6/1997 | Wong |
| 5,812,332 A | * | 9/1998 | Freeman ................... 428/156 |

FOREIGN PATENT DOCUMENTS

| | | |
|---|---|---|
| EP | 0420228 A2 | 4/1991 |
| EP | 0421886 A1 | 4/1991 |
| JP | 60-88925 | 5/1985 |
| JP | 2-279437 | 11/1990 |
| KR | 9400091 | 5/1994 |
| WO | 91/06031 | 5/1991 |

* cited by examiner

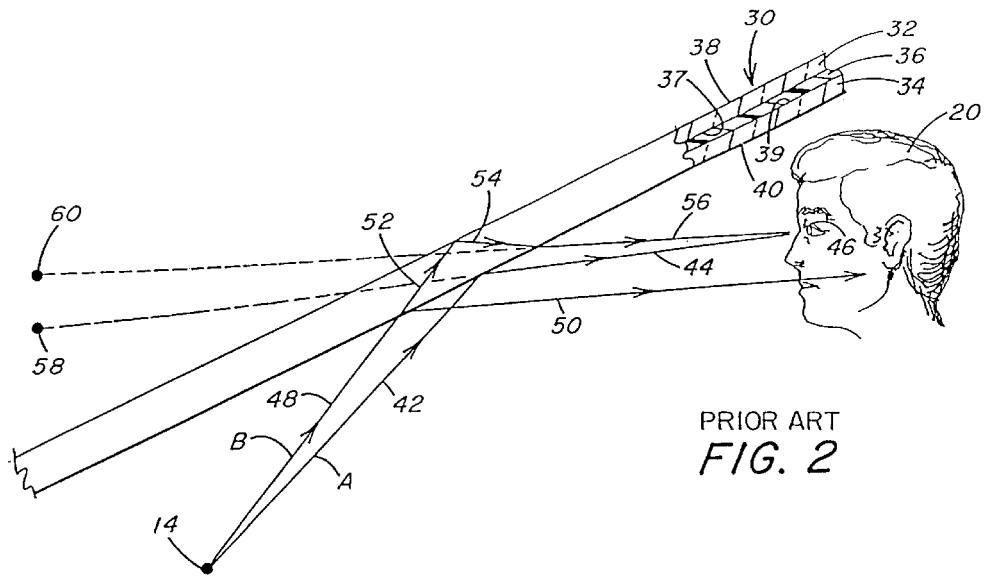
PRIOR ART
FIG. 2
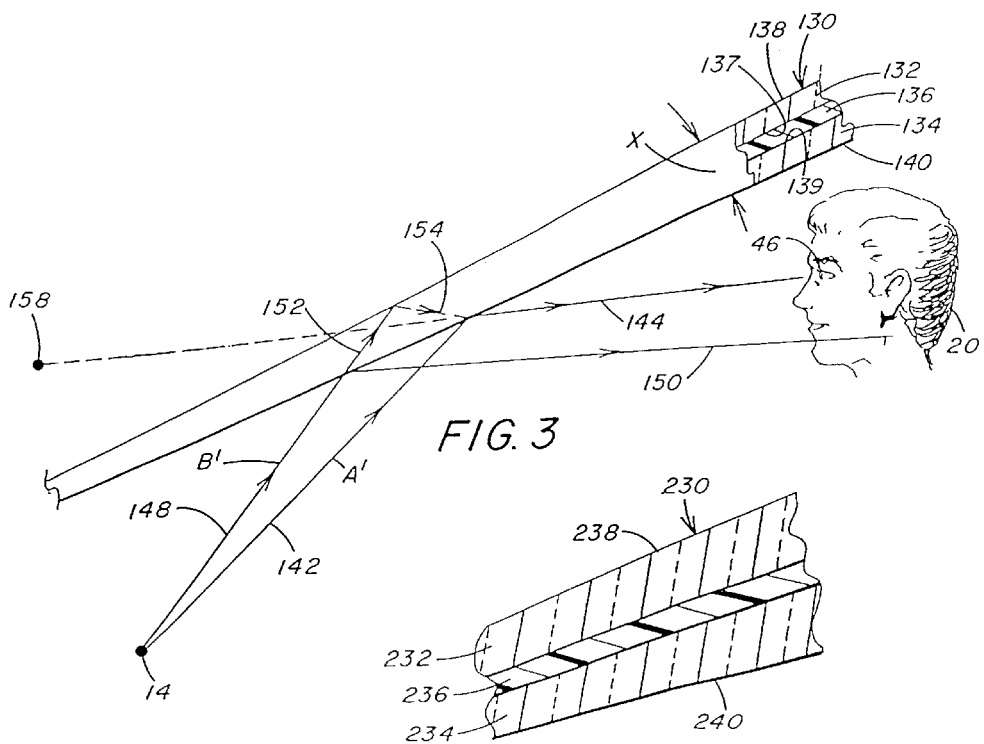
FIG. 3
FIG. 4

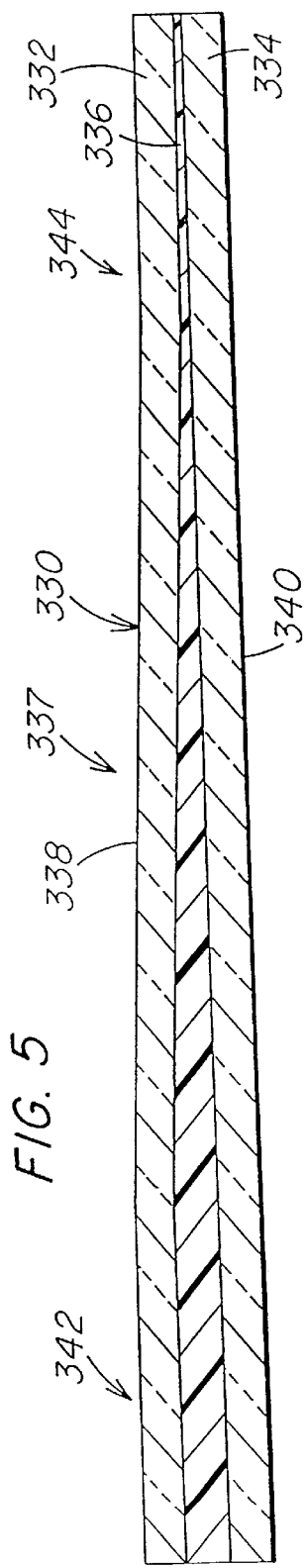
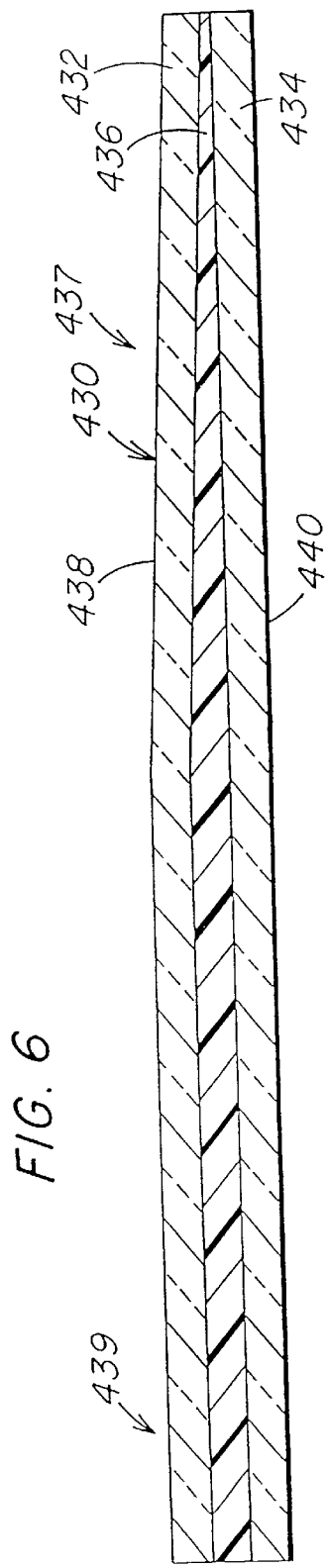
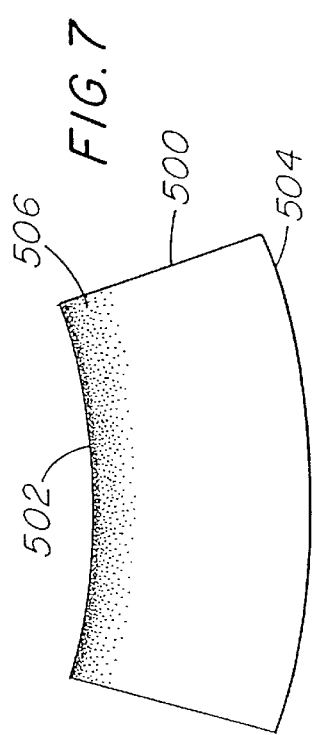

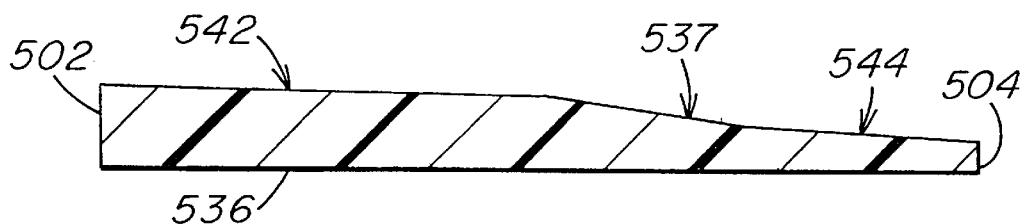
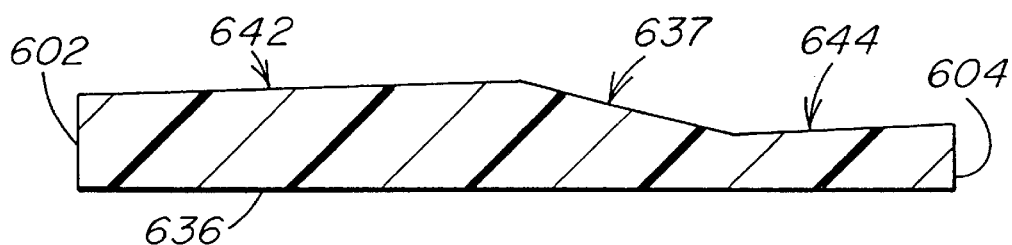
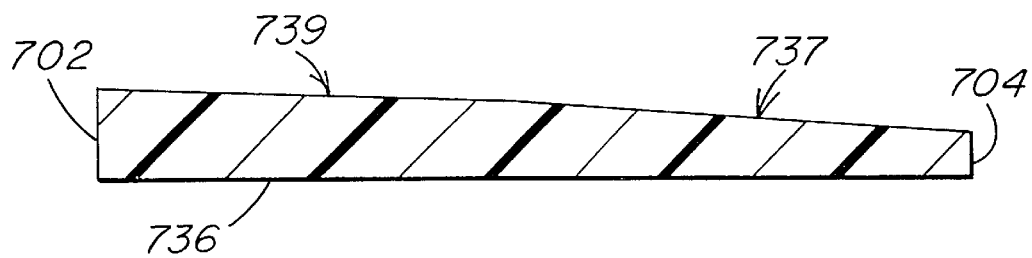
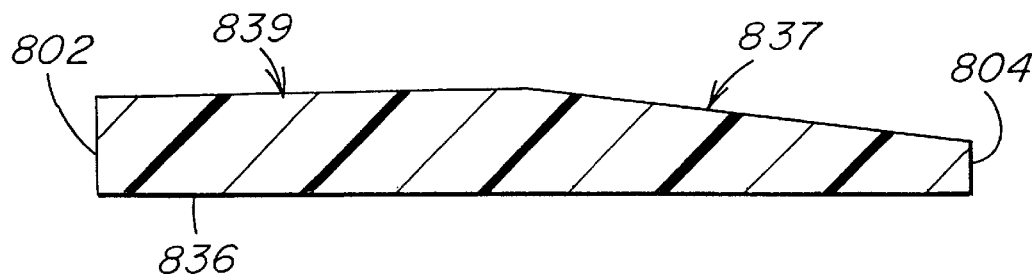

WINDSHIELD FOR HEAD-UP DISPLAY SYSTEM

RELATED APPLICATIONS

This is a divisional of U.S. patent application Ser. No. 08/664,033 filed Jun. 13, 1996, now U.S. Pat. No. 5,812,332, which is a divisional of U.S. patent application Ser. No. 08/038,749 filed Mar. 26, 1993, now abandoned, which is a continuation-in-part of U.S. application Ser. No. 07/747,765 filed Aug. 20, 1991, now abandoned, which is a continuation-in-part of U.S. application Ser. No. 07/654,408 filed Feb. 8, 1991, now abandoned, which is a continuation of U.S. application Ser. No. 07/414,492 filed Sep. 28, 1989, now abandoned.

BACKGROUND OF THE INVENTION

1. Field of the Invention

This invention relates to a windshield for a head-up display system and in particular to an automotive windshield functioning as the combiner for the head-up display system and having a wedged configuration for some selected portion of the windshield area, particularly in the viewing area of the head-up display, to eliminate double imaging and the interlayer used to provide the required wedged configuration.

2A. Technical Considerations

A head-up display system is a visual display arrangement that displays information to a viewer while he simultaneously views the road and objects outside his vehicle around and through the display. Head-up display systems are often incorporated into aircraft cockpits for pilots to monitor flight information. More recently the systems have been used in land vehicles such as cars, trucks and the like. The display is generally positioned so that the viewer does not have to glance downward to the vehicle dashboard and away from the viewing area in front of the vehicle as is required of a vehicle operator viewing vehicle operating information in a vehicle not having a head-up display.

A head-up display system generally includes a display projection system, a collimator, and a combiner. The projection system includes a light source that projects operating information through the collimator which generally aligns the projected light rays. The collimated light is then reflected off the combiner, which is in the vehicle operator's field of view. In this manner, vehicle information such as, for example, fuel information and vehicle speed is displayed within the operator's field of vision through the windshield and permits the operator to safely maintain eye contact with the road and other objects outside his vehicle while simultaneously viewing the displayed information. The reflected images of the display may be focused at a position anywhere from immediately in front of the vehicle to optical infinity.

Laminated windshields have been used as the combiner in a head-up display system to reflect a primary display image as taught in U.S. Pat. No. 2,264,044 to Lee. However, it has been observed that a secondary image is reflected off the outer surface of the windshield. This secondary image is superimposed over but offset from the primary image and reduces the overall image clarity.

It would be advantageous to have a windshield for a head-up display system which functions as a combiner and provides a clear display image without producing double images when viewing through the head-up display area, without distorting the view through other portions of the window not associated with the head-up display system, and without incorporating additional components with the windshield.

2B. Patents of Interest

U.S. Pat. No. 1,871,877 to Buckman teaches a display system having a glass sheet mounted on the windshield or dashboard which reflects instrumentation information to the vehicle operator.

U.S. Pat. No. 2,264,044 to Lee teaches a motor vehicle having an illuminated speedometer display that is reflected off the inboard surface of the vehicle windshield.

U.S. Pat. No. 2,641,152 to Mihalakis teaches a vehicle projection device wherein instrumentation information is reflected off of a reflecting screen on the inboard surface of the vehicle windshield. The reflecting surface has a satin finish and can be metal, glass, or plastic.

U.S. Pat. No. 2,750,833 to Gross teaches an optical display system for eliminating double images which occur in reflector type sights such as those used in aircraft gun sighting installations. A collimated light beam is polarized and separated into two ray branches. One of the two ray branches is then eliminated.

U.S. Pat. No. 3,276,813 to Shaw, Jr. teaches a motor vehicle display system which utilizes a highly reflective coating on the inboard surface of the vehicle windshield to reflect instrumentation information to the vehicle operator.

U.S. Pat. No. 3,446,916 to Abel teaches an image combiner utilizing a portion of the aircraft window. The inner surface portion of the window is coated with a partially reflective film.

U.S. Pat. Nos. 3,554,722, 3,591,261, and 3,647,285 to Harvey et al. teaches a double glazed glass window structure which eliminates objectionable fringe patterns produced in this structure when float glass of non-uniform thickness is utilized. The window structure includes a pair of spaced apart, float glass sheets one or both of which are tapered from a thick edge to an opposing thin edge. When both the glass sheets are tapered, the glass sheets are positioned such that a thick edge of one glass sheet is spaced from a thin edge of the opposing glass sheet.

U.S. Pat. No. 3,697,154 to Johnson teaches an optical viewing system in which images formed on the screen of a cathode ray tube (CRT) are reflected from a curved mirror having a general aspheric surface of revolution to a partially reflective combiner having two nonparallel hyperboloid surfaces, the combiner being positioned in the normal line of sight of an observer such that a collimated CRT image is reflected from the near surface of the combiner to the observer's eyes and the combiner being adapted to transmit light incident from the outside so that the CRT display is superimposed without parallax on the real world to provide a head-up display.

U.S. Pat. No. 3,870,405 to Hedges teaches a visor for use an optical element in a helmet-mounted sight having inner and outer surfaces being sections of focal paraboloids of revolution.

U.S. Pat. No. 3,899,241 to Malobicky, Jr. et al. teaches a windshield adapted for use in aircraft and includes a transparent reflective coating on the inboard surface in the center portion of the forward vision area to form a vision image receiving area. Vehicle information is reflected off the reflective coating to the vehicle operator.

U.S. Pat. No. 3,940,204 to Withrington and U.S. Pat. No. 4,218,111 to Withrington et al. teach an optical display system utilizing holographic lenses.

U.S. Pat. No. 4,261,635 to Freeman teaches a head-up display system including a holographic combiner positioned inboard of the vehicle windshield. The hologram is disposed substantially orthogonal to and midway along an axis between the observer's eye position and the projection optics so as to deviate light from an image produced by the projection optics to the observer eye with minimal field aberration.

U.S. Pat. No. 4,398,799 to Swift teaches a head-up display system which simultaneously records the pilot's view by reflecting the outside scene and the projected display by reflecting the outside scene and superimposed display off a mirror mounted on the pilot's helmet and recording the reflected view with a camera mounted on the pilot's helmet.

U.S. Pat. No. 4,613,200 to Hartman teaches a head-up display system which uses two parallel holographic optical elements to reflect instrumentation information to the vehicle operator. One of the elements is made part of or attached to the vehicle windshield.

U.S. Pat. No. 4,711,544 to Iino et al. teaches a display system for a vehicle wherein instrumentation information is reflected off the front glass of the vehicle so that the image display can be formed in a desired position, aligned with the line of sight of the driver without obstructing the front sight of the driver.

U.S. Pat. Nos. 4,787,711 and 4,892,386 and European Patent No. 229,876 to Suzuki et al. teach an on-vehicle head-up display device employing a catoptric system for a windshield glass of an automobile to project a display image onto an inner surface of the windshield glass, an optical system for letting a virtual image of the display image of the display means enter the windshield glass is adapted to make an angle formed by light beams of the virtual image entering the windshield glass less than a monocular resolving power and an optical means for correcting parallax of the light beams of the virtual image is provided between the optical system and the windshield glass to thus eliminate double imaging and binocular parallax.

Defensive Publication No. T861,037 to Christensen teaches a tapered or wedged vinyl interlayer for use in laminating windshields such that the interlayer is thicker at the top of the windshield than at the bottom of the windshield in order to eliminate double vision caused by the windshield curvature and angle of installation.

SUMMARY OF THE INVENTION

The present invention provides a windshield for a head-up display system that reduces the degree of double imaging that occurs when a laminated windshield is used as the combiner in the display system. The windshield functions as a combiner for the head-up display system without requiring any additional reflecting or transmitting elements or components to be incorporated onto or into the windshield assembly. The windshield in the present invention is constructed such that selected opposing, outer major surfaces of the windshield are non-parallel with the opposing outer major surfaces oriented relative to each other so that an image, projected from a display source and reflected off a first major surface of the windshield, is substantially superimposed over or parallel to the same image from the display source reflected off the opposing outer major surface of the windshield.

In one embodiment of the invention the windshield has a selected area that has the outer major surfaces of the windshield non-parallel to one another, and the outer major surfaces of the windshield at the remaining area generally parallel to one another. In this manner, the degree of double imaging is reduced in the area where the outer surfaces are non-parallel to one another, and the optical distortion in the remaining area is improved because the outer surfaces are parallel to one another. This may be accomplished by having one or both of the glass plies and/or the sheet of interlayer material partially tapered in thickness such that when the plies and sheet are joined together, the outer major surfaces of the windshield in the selected area are nonparallel to one another with the remaining area of the outer major surfaces of the windshield generally parallel to one another in the area other.

The present invention also provides an interlayer blank for use with a glass ply in a vehicle windshield for a head-up display system. The blank is polyvinylbutyral and includes a first portion with a predetermined thickness profile and a second portion with a tapered thickness profile different from the predetermined profile. The interlayer may be provided by casting the interlayer to the desired configuration, extruding the desired cross sectional thickness, or differentially stretching the interlayer to the desired shape or through a combination of these processes. In one particular embodiment of the invention, interlayer having a desired varying thickness profile is produced by initially forming the interlayer with a thickness profile greater than the desired profile and subsequently differentially stretching the interlayer to reduce the thickness of the interlayer such that its thickness corresponds to the desired thickness profile.

When the glass plies and the interlayer having the tapered section are assembled and laminated to form a unitary structure, the opposing major surfaces of the laminate are non-parallel in the area of the tapered section and offset at a predetermined angle in the vicinity of the tapered section. The windshield in use is positioned relative to a display system such that the images generated by light rays from the display source reflected off the non-parallel opposing major surfaces of the windshield or laminate are substantially superimposed over or parallel to each other such that double imaging is reduced if not eliminated, while the remaining sections of the windshield have the outer major surfaces substantially parallel to one another to eliminate or minimize optical distortion of objects viewed through the remaining area of the windshield.

The invention also contemplates making the windshields of the instant invention by joining glass sheets and a sheet of interlayer material to provide a windshield having the outer surfaces parallel in a first predetermined area and nonparallel in a second predetermined area.

BRIEF DESCRIPTION OF THE DRAWINGS

FIG. 2 is an enlarged, partial cross-sectional view of FIG. 1 illustrating a head up display using a windshield incorporating an interlayer having a uniform thickness.

FIG. 3 is an enlarged, partial cross-sectional view of FIG. 1 illustrating a head up display using a windshield incorporating an interlayer having a uniformly tapered thickness.

FIG. 4 is an enlarged cross-sectional view of an alternate windshield configuration.

FIGS. 5 and 6 are cross-sectional views of windshield configuration incorporating features of the present invention.

FIG. 7 is a plan view of an interlayer blank of the present invention.

FIGS. 8 through 11 are cross-sectional views of interlayer sheets incorporating alternate embodiments of the present invention.

DETAILED DESCRIPTION OF THE INVENTION

Figure 1:
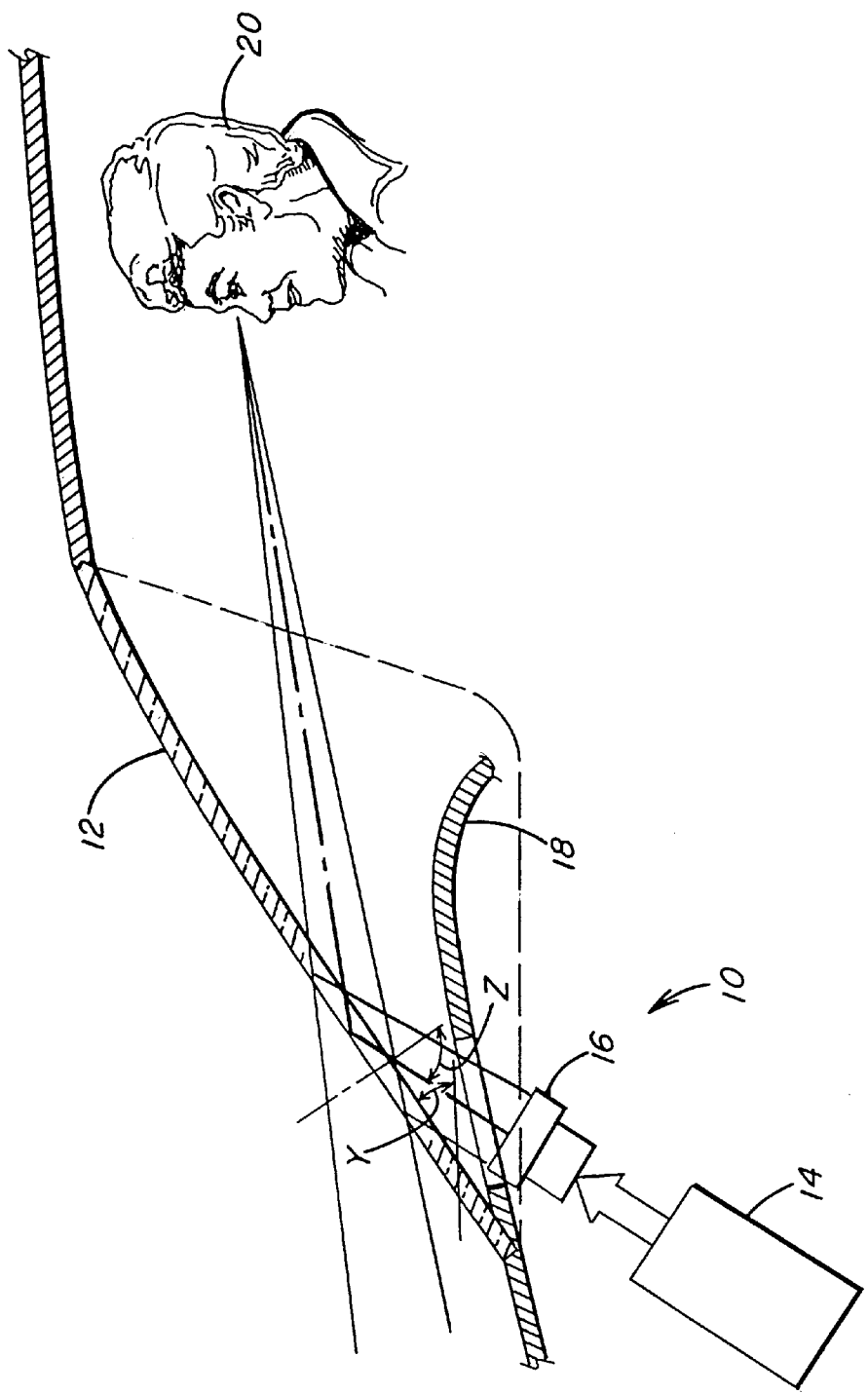
FIG. 1 is a schematic of a head-up display system for a vehicle.

The present invention relates to the elimination of double imaging in a head-up display system that uses an automotive windshield as the combiner, but it should be appreciated that the present invention may be used in any type of combiner having a laminate construction where double imaging is to be eliminated.

With reference to FIG. 1, head-up display 10 system includes a motor vehicle windshield 12, an image source 14 and a projection assembly 16, preferably mounted immediately beneath the upper surface of the vehicle dashboard 18 and positioned between the image source 14 and windshield 12. Light rays emanate from the image source 14 and are projected onto the windshield 12, which operates as a combiner as will be discussed later, and reflected into the field of vision of the vehicle operator or observer 20. The light rays projected onto the windshield 12 are collimated so as to create a virtual image in front of the car, preferably at about 5 to 50 feet (3 to 15 meters) in front of the windshield 12.

Although not limiting in the present invention, the image source 14 preferably is a transmissive liquid crystal display (LCD) that is adequately illuminated to project information carrying light rays through the projection assembly 16 onto the windshield 12 at a location within the vehicle operators direct line of sight while permitting peripheral viewing of the road and objects outside of the vehicle as the operator or observer 20 monitors the display. It is contemplated that alternative viewing locations will also provide an effective head-up display for the vehicle windshield. The displayed image (not shown) may include numerical or graphical symbols including for example, vehicle speed, fuel level, engine RPMs, temperature, and warning symbols.

The following discussion will be directed towards the use of a prior. art windshield which incorporates an interlayer having a constant thickness, as the combiner in a head-up display system which projects an image a finite distance in front of the windshield. In particular, referring to FIG. 2, windshield 30 represents a windshield assembly with the opposing inner and outer major surfaces of the windshield being parallel to each other for the full length of the windshield, i.e. from the top edge to the opposite edge and between the side edges. The windshield 30 includes outer glass ply 32 bonded to inner glass ply 34 by an interlayer material 36. Because the thickness of the interlayer 36 is fairly uniform and the opposing major surfaces of each glass ply are substantially parallel to each other, i.e., inner surface 37 of the ply 32 is parallel to its outer surface 38 and inner surface 39 of the ply 34 is parallel to its outer surface 40, the outer major surface 38 of the glass ply 32 is parallel to the outer major surface 40 of the glass ply 34 after the glass plies 32 and 34 and interlayer 36 are laminated together to form a unitary structure. Although not limiting in the present invention, for the purposes of illustration, surfaces 38 and 40 are assumed to be planar in the following discussion. However, the surfaces may be non-planar, as will be discussed later.

With continued reference to FIG. 2, a light ray A from image source 14 is directed along line 42 and a portion of the light ray A is reflected off surface 40 of the ply 34 along line 44 to eye 46 of the vehicle operator 20. Additional light rays from the source 14 are directed along additional lines. For example, light ray B is directed along line 48 and a portion of the light ray B is reflected off the surface 40 along line 50 toward the vehicle operator 20. However, the ray B along the line 50 is not directed to the eye 46 as shown in FIG. 2 so it will not be detected by the observer 20.

A portion of the light ray B which is directed along line 48 will enter the windshield assembly 30 and be refracted along line 52. The angular difference between the lines 48 and 52 depends on the angle of refraction as the light ray passes through the air and into the glass ply 34. The angle of refraction in turn depends, in part, on the angle at which ray B is incident on the surface 40 and the relative densities of the air and the glass. The ray B passes through the windshield assembly 30 and a portion of the light ray B is reflected off the surface 38 of the ply 32 along line 54. It is assumed that the refractive index of interlayer 36 is essentially the same as that of the glass plies 32 and 34 so that the light rays are not redirected as they pass through the windshield assembly 30 along lines 52 and 54.

A portion of the light ray B leaves the windshield assembly 30 at the surface 40 of the glass ply 34 where the direction of the light is again changed due to the difference in the refraction index between the windshield assembly 30 and the air, as discussed earlier, and directed along line 56 to the operator's eye 46. Because the light rays A and B received by the eye 46 from the image source 14 are along two different lines, i.e. lines 44 and 56, which are convergent toward one another to the eye of the observer 20 rather than parallel, the observer 20 will perceive two offset images where in fact there is only one image source 14. The first image 58, or virtual image, is the image seen by the observer 20 from the portion of the light ray A directed along line 44. The second image 60 is the image seen by the observer 20 from the portion of the light ray B directed along line 56.

When viewing both images, the virtual image 58 will appear brighter than the second image 60 because a greater portion of the light from the image source 14 which was initially directed along line 42 will be directed along line 44 as compared to the amount of light initially directed along line 48 and which is finally directed along line 56 to the observer 20. This condition of seeing two offset images is commonly referred to as double imaging, or ghost imaging, and results when the outer surfaces of the windshield assembly i.e. surfaces 38 and 40 of windshield assembly 30, are parallel to each other. Stated another way, double imaging occurs when the light rays A and B, projected from image source 14 onto parallel surfaces 38 and 40, are directed toward the eye of the observer along non-parallel lines, i.e., lines 44 and 56 which converge toward each other to the eye 46 of the operator 20.

In order to reduce the amount of double imaging in the windshield assembly 30, the present invention may be used to modify the windshield structure by adjusting the spaced relationship of the surfaces 38 and 40 relative to one another such that the portion of the light rays A and B directed to the eye of the observer are superimposed over or parallel to one another. Referring to FIG. 3, windshield 130 includes outer glass ply 132 bonded to inner glass ply 134 by an interlayer material, e.g., a thermoplastic material 136 along inner major surfaces 137 and 139 of plies 132 and 134, respectively. The interlayer 136 is fabricated in such a way as to gradually taper in thickness from top to bottom of the windshield with the thicker section at the top edge as reviewed in FIG. 3.

As a result of the "wedged" shape section of the interlayer, when the windshield components are assembled and laminated, outer major surface 138 of glass ply 132 and outer major surface 140 of glass ply 134 will be non-parallel. It has been found that by controlling the amount by which the glass plies 132 and 134 of the windshield 130 are offset from each other, the double imaging encountered when using a windshield as shown in FIG. 2 as a combiner can be reduced in a manner to be discussed below. The actual wedge angle X required to reduce the double imaging depends, in part, upon the thickness of the windshield, the windshield materials, and the relative positions and orientations of the image source 14, the windshield 130 and the vehicle operator 20. Although not limiting in the present invention, the interlayer 136 can be cast in place to provide the desired wedge angle X. As an alternative, the interlayer 136 can be extruded or differentially stretched in any convenient manner known in the art, such as that disclosed in U.S. Pat. No. 4,201,351 to Tolliver and U.S. Pat. No. 4,554,713 to Chabel, which teachings are incorporated herein by reference, or cast or extruded and subsequently differentially stretched as will be discussed later in more detail, to achieve the desired wedge angle.

With continued reference to FIG. 3, the discussion will now be directed to the elimination or minimization of double images or ghost images using a windshield that has wedge or taper, i.e., nonparallel outer surfaces. Light ray $A^1$ from the image source 14 is directed along line 142 and a portion of the light ray $A^1$ is reflected off the surface 140 along line 144 to the eye 46. Another portion of the light ray $B^1$ directed along line 148 is reflected from the surface 140 along line 150 such that it is not seen by the observer 20 as was discussed for the portion of the light ray B reflected from the surface 40 along line 50 of the prior art arrangement shown in FIG. 2. The remaining portions of the ray $B^1$ are refracted through the glass plies 132 and 134 and the interlayer 136 along line 152 and refracted as it leaves the assembly 130 to the observer's eye 46 along line 144 in a similar manner as that discussed for the ray B shown in FIG. 2. However, unlike the windshield assembly 30 in FIG. 2 wherein the line 56 from the ray B is along a different orientation than line 44 from ray A, in the present invention as shown in FIG. 3, the wedge angle X is such that the refracted light from light ray $B^1$ exits the assembly 130 along the line 144, i.e., parallel or superimposed over the light from ray $A^1$ reflected off the surface 140 of the glass ply 134 also moving along the line 144. As a result, the image viewed by the observer 20 resulting from light rays $A^1$ and $B^1$ are superimposed over or parallel to each other so that there is viewed only a single image 158.

It should be appreciated that in a windshield assembly, the surfaces 138 and 140 of the glass plies 132 and 134, respectively, are often not planar but rather have a curved configuration. However, the amount of relative curvature in the windshield assembly 130 within the small area used as the combiner is relatively small so that the area within the combiner portion of the windshield 130 is nearly planar. Furthermore, if required due to excessive curvature of the windshield within the combiner area, the image from the image source 18 can be distorted, for example by incorporating additional lens arrangements (not shown) into the projection assembly 16 (shown only in FIG. 1) to account for the curvature of the windshield surfaces.

In one particular embodiment of a windshield construction as illustrated in FIG. 3, the windshield 130 includes 0.090 inch (2.3 mm) thick glass plies and two polyvinylbutryl interlayer plies. Each interlayer ply is originally 0.020 inches (0.05 mm) thick and is differentially stretched so that each interlayer ply has a taper of approximately, 0.003 inches (0.076 mm) over a 36 inch (91 cm) interlayer width for a combined thickness differential of approximately 0.006 inches (0.152 mm) from the top to the bottom edge (as viewed in FIG. 3) when incorporated into the windshield 130. It should be obvious to one skilled in the art that the two interlayer plies may be replaced by a single ply having the required wedge configuration. Referring to FIG. 1, it has been observed that a windshield of this construction, mounted in a vehicle at an installation angle Y of approximately 30° from the horizontal with an angle of incidence Z between the windshield 12 and image source 14 of approximately 65° significantly reduces the amount of double imaging in a head-up display system as compared to a conventional windshield having a non-wedged configuration.

Although the windshield configuration 130 as shown in FIG. 3 includes two glass sheets each having generally parallel opposing major surfaces and a tapered interlayer ply, based on the teachings of this disclosure, it is obvious to one skilled in the art that other windshield configurations can be used to provide a wedged windshield configuration similar to that shown in FIG. 3. In particular, referring to FIG. 4, one or both of the glass plies 232 and 234 may be provided with a taper such that when the assembly 230 is laminated to form a unitary structure using a non-stretched interlayer 236, opposing surfaces 234 and 236 of the windshield 230 are non-parallel and are oriented relative to each other so as to eliminate the double imaging. It is further contemplated that one or more tapered interlayers may be used in combination with one or more tapered glass plies so that the final laminated assembly provides a required windshield construction having the configuration required to reduce double imaging. In other words, the windshield configuration as taught herein to reduce double imaging in a head-up display system is not directed to providing glass plies and a sheet of interlayer that does or doesn't have a taper as long as after the plies are secured about the interlayer the outer surfaces of the windshield are nonparallel so that the portions of the light rays $A^1$ and $B^1$ directed toward the eye of the observer are parallel or superimposed over one another along the line 144 as shown in FIG. 3.

It is an object of this invention to provide a windshield configuration wherein the outer surfaces of the windshield are non-parallel only in the head-up display area of the windshield. In this manner, the problem of double imaging of the display is reduced or eliminated while at the same time optical distortions associated with viewing objects through wedged glass or a wedged windshield is eliminated. More particularly, it has been noted that the use of non-tapered or non-wedged areas of laminated glass, i.e., outer surfaces of the laminated windshield being substantially parallel to one another for the upper portion of a windshield as mounted, with the tapered or wedged areas, i.e. a partial wedge, at or near the bottom of the windshield as mounted, improves the optics of the windshield. More particularly, a vehicle operator viewing an object such as a traffic light at a 45° angle through an upper area of the windshield encounters less double vision of objects viewed through a non-tapered or non-wedged windshield than a tapered or wedged windshield. However, a vehicle operator viewing an object such as a head-up display at a 90° angle through the bottom portion of the windshield will observe a double image for the reason discussed above. Thus, a windshield having a partial wedge area such as the windshield types shown in FIGS. 5 and 6 would be advantageous over a windshield of the type shown in FIG. 3 that has a taper or wedge from the top edge of the windshield to the opposite or bottom edge.

In the following discussions regarding FIGS. 5 and 6, the left hand side of windshields 330 and 430 as viewed in FIGS. 5 and 6, respectively, is the top end of the windshield as mounted in a vehicle and the right side as viewed in FIGS. 5 and 6 is the opposite or bottom end of the windshield as mounted. If a shade band (shown only in FIG. 7) of a type well known in the art were incorporated into windshields 330 and 430, it would be positioned at the left side or top end of the windshield. With reference to FIG. 5, the windshield 330 has glass plies 332 and 334 secured to each other about interlayer 336. The windshield 330 has a partial wedge by providing outer surface 338 of the glass ply 332 nonparallel to the outer surface 340 of glass ply 334 in the mid-area 337 and the outer surfaces 338 and 340 of the glass plies 332 and 334, respectively, in the upper area 342 and lower area 344 parallel to one another. This may be accomplished by providing the glass plies 332 and 334 with a constant thickness throughout their length, i.e. from the top edge to the bottom edge of the windshield, and width, i.e. from one side to the other side (only one side shown in FIGS. 5 and 6), and an interlayer 336 with a predetermined non-uniform thickness profile to position the desired wedge in the windshield at the required location. More specifically, the portions of interlayer 336 in the top and bottom areas 342 and 344, respectively, of the windshield 330 are provided with a constant thickness and the portion of the interlayer in the mid-area 337 are provided with a tapered thickness.

A windshield of the type shown in FIG. 5 may be constructed using a sheet 336 of polyvinylbutyral that has a constant thickness in area 342 of about 0.034 to 0.040 inches (0.086 to 0.102 cm), a constant thickness in area 344 of about 0.027 to 0.030 inches (0.069 to 0.076 cm), and varying thickness in area 337 that decreases, preferably uniformly, from the constant thickness in area 342 to the constant thickness in area 344. As an example, windshield 330 may include a pair of 0.090 inch (2.3 mm) thick glass plies 332, 334. The glass plies would each have a length from top to bottom of approximately 45 inches (114.3 cm). A sheet 336 of polyvinylbutyral preferably having a shape as shown in FIG. 7 would be cut to fit between the glass plies. The polyvinylbutyral sheet 336 would have a constant thickness of 0.034 inches (0.086 cm) from the top edge to a distance of 25 inches (63.5 cm) therefrom (top area 342); a taper defined by a thickness of 0.034 inches (0.086 cm) at a point spaced 25 inches (63.5 cm) from the top edge of the windshield and a thickness of 0.030 inches (0.076 cm) at a point 37 inches (94 cm) from the top of a windshield (mid area 337), and a constant thickness of 0.030 inches (0.076 cm) from a point 37 inches (94 cm) from the top edge to the bottom edge (bottom area 344).

FIG. 6 illustrates another embodiment of the invention directed to partial wedging of the windshield. The windshield 430 shown in FIG. 6 has a pair of glass plies 432 and 434 about an interlayer 436. The thickness of the glass plies and interlayer are selected to provide the windshield with a lower area 437 having outer surface 438 and 440 nonparallel to one another and upper area 439 having outer surfaces 438 and 440 of the windshield parallel to one another. In FIG. 6, this arrangement may be achieved by using glass plies 432 and 434 of constant thickness and a sheet of interlayer material 446 having a non-uniform thickness profile that has a constant thickness at its upper portion and a taper at its lower portion.

A windshield of the type shown in FIG. 6 may be constructed using a sheet 436 of polyvinylbutyral that has a constant-thickness in area 439 of about 0.034 to 0.040 inches (0.086 to 0.102 cm) and varying thickness in area 437 that decreases, preferably uniformly, from the constant thickness in area 439 to a thickness along its lower edge of about 0.027 to 0.030 inches (0.069 to 0.076 cm). As an example, the windshield 430 may include a pair of 0.090 inch (2.3 mm) thick glass plies 432, 434. The glass plies would each have a length of 45 inches (114.3 cm). A sheet 436 of polyvinylbutyral preferably having a shape shown in FIG. 7, would be cut to fit between the glass plies. The sheet 436 would have a constant thickness of 0.038 inches (0.097 cm) from the top edge to a distance of 25 inches (63.5 cm) therefrom (upper area 439) and a taper defined by a thickness of 0.038 inches (0.097 cm) at a point spaced 25 inches (63.5 cm) from the top edge to a thickness of 0.030 inches (0.076 cm) at the bottom edge (lower area 437).

Referring to FIG. 1, it has been observed that windshields of the construction discussed above and shown in FIGS. 5 and 6 mounted in a vehicle at an installation angle Y of approximately 30° with an angle of incident Z between the mid-section 337 of the windshield 330 or the lower area 437 of the windshield 430 and the image source 14 of approximately 65° significantly reduces the amount of double imaging in a head-up display system as compared to the prior art windshield having a non-wedged configuration while maintaining the optical properties of the prior art windshield in the upper and lower areas 342 and 344 of the windshield 330 and the upper area 439 of the windshield 430.

In the windshield construction of the type shown in FIGS. 5 and 6, the non-tapered sections, e.g., areas 342 and 344 of the windshield 330 of FIG. 5 and area 449 of the windshield 430 of FIG. 6, there will be minimal, if any, optical distortion because the outer surfaces of the windshield in those portions are parallel.

As discussed earlier, interlayers 336 and 436 may be formed by casting, extrusion, or differential stretching or a combination of these processes. It should be appreciated that differential stretching of the interlayer and subsequent cutting of the interlayer into blanks for incorporation into the windshield, results in an interlayer blank 500 having a peripheral configuration that is generally quadrilateral in shape with two opposing acurate sides 502 and 504 as shown in FIG. 7. It should further be appreciated that the stretching also facilitates the use of interlayer having a shade band 506, as is widely used in the art. More particularly, interlayer 500 is generally supplied as a continuous ribbon or web of material having straight, longitudinally extending opposing edges and a shade band incorporated into the web along and generally parallel to an upper edge of the web. The differential stretching operation stretches the bottom edge 504 of the interlayer more than the top edge 502 so that the initially opposing straight edges are formed into opposing arcuate edges. This stretching may be accomplished in a continuous manner by passing the continuous web over a series of shaping rolls. For example, the web is moved successively over a cylindrical heating roll to heat the interlayer prior to stretching, a conical heating roll to differentially stretch the interlayer to a desired contour, and a conical cooling roll to maintain the web's stretched configuration, as disclosed in U.S. Pat. No. 4,554,713. As an alternative, the interlayer web may be stretched in a batch fashion by wrapping a predetermined amount of interlayer around an adjustable cylindrical roll and expanding portions of the roll to form a conical surface with the circumference of the expanded roll at the end corresponding to the bottom of the interlayer being greater than the circumference at the opposite end, i.e. the end corresponding to the top of the interlayer, as disclosed in U.S. Pat. No. 4,201,351. During this stretching operation, the thickness of the interlayer is reduced, with this reduction being larger at the bottom of the interlayer since it is stretched a greater amount than the top portion.

As a result, if the sheet 336 is initially formed so that it has a constant thickness in areas 342 and 344, and the sheet is differentially stretched, as discussed above, to a shape a shown in FIG. 7, sheet 336 in areas 342 and 344 would not have a constant thickness but rather have a slight taper as shown in FIG. 8. Although not limiting in the present invention, it is expected that the taper would be on the order of 0.001 to 0.003 inches over a 25 inch distance (0.025 to 0.076 mn over 63.5 cm). It is noted that this rate of taper, i.e. the change in thickness over a given length, is less than the rate of taper in areas 337 and 437 of interlayers 336 and 436, respectively, which correspond to the display areas of the windshield. For example, interlayer 536 of the type shown in FIG. 8 would have a thickness that decreases in upper area 542 from about 0.034 to 0.040 inches (0.086 to 0.102 cm) along upper edge 502 to 0.031 to 0.039 inches (0.079 to 0.099 cm), decreases in mid-area 537 from about 0.031 to 0.039 inches (0.079 to 0.099 cm) to 0.028 to 0.030 inches (0.071 to 0.076 cm), and decreases in lower area 544 from about 0.028 to 0.030 inches (0.071 to 0.076 cm) to 0.027 to 0.029 inches (0.069 to 0.074 cm) along lower edge 504. If desired, to compensate for this tapering, the sheet 336 in FIG. 5 may be initially formed to a thickness profile such that after differential stretching, areas 342 and 344 each have a constant thickness. More particularly, the interlayer 336 may be initially cast or extruded with areas 342 and 344 having a slightly tapered thickness profile, with their thickness increasing from the top edge towards the bottom edge of the interlayer as shown in FIG. 9 so that after differential stretching, their profiles will have a constant thickness. For example, interlayer 636 of the type shown in FIG. 9 would have a thickness that increases in upper area 642 from about 0.034 to 0.040 inches (0.086 to 0.102 cm) along upper edge 602 to 0.035 to 0.043 inches (0.089 to 0.109 cm), decreases in mid-area 637 from about 0.035 to 0.043 inches (0.089 to 0.109 cm) to 0.028 to 0.035 inches (0.071 to 0.089 cm), and increases in lower area 644 from about 0.028 to 0.035 inches (0.071 to 0.089 cm) to 0.029 to 0.036 inches (0.074 to 0.091 cm) along lower edge 604.

Similarly, if sheet 436 in FIG. 6 initially has a constant thickness in area 439 and is differentially stretched, the interlayer in area 439 will have a slight taper as shown in FIG. 10. For example, interlayer 736 of the type shown in FIG. 10 would have a thickness that decreases in upper area 739 from about 0.034 to 0.040 inches (0.086 to 0.102 cm) along upper edge 702 to 0.031 to 0.039 inches (0.079 to 0.099 cm) and decreases in lower area 737 from about 0.031 to 0.039 inches (0.079 to 0.099 cm) to 0.027 to 0.030 inches (0.069 to 0.076 cm) along lower edge 704. If desired, sheet 436 of FIG. 6 may be formed to an initial thickness profile such that after differential stretching, area 439 of sheet 436 has a constant thickness. More particularly, the interlayer 436 may be initially cast or extruded with area 439 having a slightly tapered thickness profile, with its thickness increasing from the top edge towards the bottom edge of the interlayer so that after differential stretching, its profiles will have a constant thickness as shown in FIG. 11. For example, interlayer 836 of the type shown in FIG. 11 would have a thickness that increases in upper area 839 from about 0.034 to 0.040 inches (0.086 to 0.102 cm) along upper edge 802 to 0.035 to 0.043 inches (0.089 to 0.109 cm) and decreases in lower area 837 from about 0.035 to 0.043 inches (0.089 to 0.109 cm) to 0.029 to 0.036 inches (0.074 to 0.091 cm) along lower edge 804.

It should be further appreciated that even with windshield configurations where interlayer areas 542 and 544 shown in FIG. 8 and area 739 shown in FIG. 10 have a slight taper, any optical distortion in these areas due to the outer surfaces of. the windshield being non-parallel would be minimal.

Refereeing to FIG. 7, the stretching operation also forms the shade band 506 along arcuate path so that when the interlayer 500 is positioned between two glass plies and the assembly is laminated to form a windshield, the shade band 506 remains generally parallel with the upper edge of the windshield. In this manner, when the windshield is installed in a vehicle, the shade band 506 will have a generally horizontal orientation.

Cast or extruded interlayer may also be made to provide the same blank peripheral contour as shown in FIG. 7, with or without the contoured shade band.

It is obvious that multiple sheets of polyvinylbutyral interlayer may be used in place of the single sheets 336, 436, 536, 636, 736 and 836 provided that when they are used in combination, the resulting multi-layered interlayer has the same thickness profiles as discussed above with respect to a single interlayer blank.

As can now be appreciated, the partial wedging of the windshields 330 and 430 can be attained in any convenient manner. For example, one or more of the glass plies may have varying thicknesses and/or the interlayer may have varying thicknesses in the wedged sections, i.e. area 337 of the windshield 330 and area 437 for the windshield 430. The requirement in the practice of the invention is that when the windshield is assembled using the glass plies and interlayer, selected areas of the windshield have the outer surfaces nonparallel to one another while the other areas have the outer surfaces parallel or nearly parallel. As used herein and as can now be appreciated the term "outer surface parallel" does not require the surfaces to be perfectly parallel to one another but have the degree of parallelism that is usually observed in the prior art windshields to which this invention is directed. The invention also includes windshield configurations where the outer major surfaces of the windshield in the non-display areas are not parallel but are angularly offset a small amount which is less than the offset in the display area, as discussed above. Further, the invention was discussed with the windshield having the tapered area extending from side to side; however, as can now be appreciated only the area in front of the observer may have the partial wedge with the remaining area of the windshield having parallel outer surfaces.

Further from the foregoing discussion, it can now be appreciated that the invention may be practiced by tapering selected sections of a sheet of interlayer, by providing a piece of tapered interlayer over a sheet of interlayer having a constant thickness, by providing a glass ply having selected portions tapered by adding a piece of tapered glass to a glass ply having a constant thickness and/or by removing glass, e.g., by grinding and polishing a selected section of the glass.

Still further, the invention may be practiced using colored glass of the type known in the art, e.g. such as that taught in U.S. Pat. No. 4,792,536, may be used on windshields having environmental coatings, e.g., of the type taught in U.S. Pat. No. 4,610,771, may be used on heatable windshields, e.g., of the type taught in U.S. Pat. No. 4,820,902 or may be used with a coating on any surface of the glass plies at least in the area of the windshield having nonparallel outer surfaces to enhance the image, e.g., coatings of the type taught in U.S. Pat. No. 3,899,241, which teachings of these patents are hereby incorporated by reference.

The forms of this invention shown and described in this disclosure represent illustrative preferred embodiments and various modifications thereof. It is understood that various changes may be made without departing from the scope of the invention as defined by the claimed subject matter which follows.

I claim:

1. An automotive transparency for use with a heads-up display system comprising:

a first glass ply;

a second glass ply, the first and second glass plies each having a constant thickness of 0.090 inch and a distance between top of the plies to bottom of the plies of 45 inches;

an interlayer between the first and second glass plies;

the interlayer has a top edge and an opposite bottom edge, the interlayer having a constant thickness of 0.038 inch from the top edge to a distance of 25 inches therefrom defined as a thickness change line and a taper from the thickness change line to the bottom edge of the interlayer, wherein the thickness of the interlayer at the thickness change line is 0.038 inch and at the bottom edge is 0.030 inch.

2. An automotive transparency comprising:

a first glass ply and a second glass ply each having a constant thickness of 0.090 inch and a length of 45 inches; and an interlayer between the first glass ply and second glass ply and having a constant thickness in a first predetermined area and a varying thickness in a second predetermined area, wherein the first predetermined area of the interlayer is adjacent a top edge of the interlayer and the second predetermined area of the interlayer is adjacent a bottom edge of the interlayer, and the first predetermined area of the interlayer has a constant thickness of 0.038 inch from the top edge to a distance of 25 inches therefrom defined at a thickness change line and the second predetermined area of the interlayer has a taper from the thickness change line to the bottom edge of the interlayer, and the thickness of the interlayer at the thickness change line is 0.038 inch and at the bottom edge is 0.030 inch.

3. The automotive transparency of claim 2 wherein the interlayer is a sheet of polyvinylbutyral.

4. The automotive transparency of claim 2 used in combination with a heads-up display system comprises:

means to project a desired display having first and second light rays, and means for mounting the automotive transparency and said means to project relative-to one another to direct the first and second light rays toward the second predetermined area.

5. The automotive transparency of claim 2 wherein the interlayer is a plastic interlayer.

6. A vehicle windshield for a head-up display comprising:

a first glass ply having a constant thickness;

a second glass ply having a constant thickness; and a polyvinylbutyral interlayer having a constant thickness in a first predetermined area and a varying thickness in a second predetermined area;

the first glass ply and second glass ply secured together by the interlayer material to form a laminate having a first outer major surface, an opposing second outer major surface, a first predetermined area defined by the first predetermined area of the interlayer over which the outer major surfaces are substantially parallel to one another, and a second predetermined area defined by the second predetermined area of the interlayer over which the outer major surfaces are nonparallel to one another, wherein the windshield has a length of 45 inches, the first predetermined area of the interlayer is adjacent the top of the windshield and extends for a distance of 25 inches and the second predetermined area of the windshield has a wedge-shaped thickness profile.

7. An interlayer blank for securing glass plies together comprising:

a first predetermined area having a constant thickness of 0.038 inch and a second predetermined area having a varying thickness, the interlayer having a top edge and a bottom edge, wherein the first predetermined area of the interlayer is adjacent the top edge and the second predetermined area of the interlayer is adjacent the bottom edge and the first predetermined area of the interlayer has a constant thickness from the top edge to a distance of 25 inches therefrom defined as a thickness change line and the second predetermined area has a taper from the thickness change line to the bottom edge of the interlayer, wherein the thickness of the interlayer at the thickness change line is 0.038 inch and that the bottom edge is 0.030 inch.

8. The interlayer blank of claim 7 wherein the interlayer blank is a sheet of polyvinylbutyral and the second predetermined area viewed in cross-section has a wedged shape.

9. The interlayer blank of claim 7 wherein the interlayer blank is a sheet of polyvinylbutyral.

10. The interlayer blank of claim 7 wherein the interlayer is a sheet of polyvinylbutyral, and the distance between top of the interlayer blank and bottom of the interlayer blank is 45 inches.

11. The interlayer blank of claim 2 wherein the top edge has a shade band.

* * * * *